United States Patent

Heintjes

(10) Patent No.: US 9,261,150 B2
(45) Date of Patent: Feb. 16, 2016

(54) DRIVE SYSTEM FOR A HIGH LIFT SYSTEM OF AN AIRCRAFT AND METHOD FOR DETECTING A MISALIGNMENT BETWEEN A TRANSMISSION SHAFT AND AN OPENING IN A DRIVE SYSTEM FOR A HIGH LIFT SYSTEM OF AN AIRCRAFT

(71) Applicant: Airbus Operations GmbH, Hamburg (DE)

(72) Inventor: Mark Heintjes, Weyhe (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 107 days.

(21) Appl. No.: 14/269,331

(22) Filed: May 5, 2014

(65) Prior Publication Data

US 2014/0336891 A1  Nov. 13, 2014

(30) Foreign Application Priority Data

May 7, 2013  (EP) .................................. 13166774

(51) Int. Cl.
 *F16D 43/02*  (2006.01)
 *B64C 13/28*  (2006.01)
 *B64D 45/00*  (2006.01)

(52) U.S. Cl.
 CPC ................ *F16D 43/02* (2013.01); *B64C 13/28* (2013.01); *B64D 2045/001* (2013.01)

(58) Field of Classification Search
 None
 See application file for complete search history.

(56) References Cited

U.S. PATENT DOCUMENTS

| | | | |
|---|---|---|---|
| 4,856,379 A | 8/1989 | Jafarey | |
| 4,909,363 A * | 3/1990 | Trommer | B64C 13/28 188/134 |
| 7,044,024 B1 * | 5/2006 | Younkin | B64C 13/24 180/65.1 |
| 7,048,234 B2 | 5/2006 | Recksiek et al. | |
| 7,293,524 B2 | 11/2007 | Darby | |
| 8,746,614 B2 | 6/2014 | Heintjes | |
| 2013/0087662 A1 | 4/2013 | Soenarjo | |

(Continued)

FOREIGN PATENT DOCUMENTS

CN  1882474 A  12/2006

OTHER PUBLICATIONS

State Intellectual Property Office of the Peoples' Republic of China, Office Action for Chinese Patent Application No. 2014101914664 mailed Sep. 2, 2015.

(Continued)

*Primary Examiner* — Edwin A Young
(74) *Attorney, Agent, or Firm* — Ingrassia Fisher & Lorenz, P.C.

(57) ABSTRACT

An arresting apparatus for arresting a rotational motion of two components relative to each other is provided. The arresting apparatus includes a first arresting means having a longitudinal axis and at least one first engaging element, and a second arresting means having an opening and at least one second engaging element. In a first mode of operation, the first arresting means extends through a first section of the opening of the second arresting means such that it is freely rotatable and the first engaging element and the second engaging element are distanced from each other. In a second mode of operation, the first arresting means is misaligned and extends through a second section of the opening of the second arresting means such that the first engaging element and the second engaging element engage and arrest the first arresting means relative to the second arresting means.

20 Claims, 4 Drawing Sheets

(56) References Cited

U.S. PATENT DOCUMENTS

2013/0181089 A1* 7/2013 Recksiek .................. B64C 9/16
 244/99.3
2014/0297102 A1* 10/2014 Moy ...................... B64D 45/00
 701/33.9

OTHER PUBLICATIONS

European Patent Office, Extended European Search Report for European Patent Application No. 13 166 774.3, mailed Oct. 10, 2013.

* cited by examiner

DRIVE SYSTEM FOR A HIGH LIFT SYSTEM OF AN AIRCRAFT AND METHOD FOR DETECTING A MISALIGNMENT BETWEEN A TRANSMISSION SHAFT AND AN OPENING IN A DRIVE SYSTEM FOR A HIGH LIFT SYSTEM OF AN AIRCRAFT

CROSS-REFERENCE TO RELATED APPLICATIONS

This application claims priority to European Patent Application No. 13 166 774.3, filed May 7, 2013, which is incorporated herein by reference in its entirety.

TECHNICAL FIELD

The technical field relates to a drive system for a high lift system of an aircraft and a method for detecting a misalignment between a transmission shaft and an opening in a drive system for a high lift system of an aircraft.

BACKGROUND

Typically, high lift systems of commercial and military aircraft are powered by a centralized power control unit (PCU) positioned in the fuselage of the aircraft and connected to a transmission shaft arrangement providing mechanical power to geared actuators at flap or slat panel drive stations. The transmission shaft arrangement comprises at least two transmission shafts, each extending from the PCU into a wing of the aircraft. Commonly, wing tip brakes are coupled with the transmission shafts and are located somewhere in the region of the wing tips. A wing tip brake is capable to arrest and hold the respective transmission shaft.

The transmission arrangement may also comprise several gearboxes, universal joints, spline joints and other components for compensating manufacturing tolerances and deflections of the wing structure during flight. Typically, each flap or slat is driven by at least one geared rotary actuator (GRA) coupled with a transmission shaft. A speed sensor in the PCU allows to detect and compare the actual speed of the PCU with its commanded speed.

EP 1 462 361 B1 and U.S. Pat. No. 7,048,234 B2 disclose an adaptive flap and slat drive system for an aircraft comprising a central power control unit.

In addition, other objects, desirable features and characteristics will become apparent from the subsequent summary and detailed description, and the appended claims, taken in conjunction with the accompanying drawings and this background.

SUMMARY

By means of the speed sensor and the comparison of detected and commanded speeds, the unlikely event of a blocked or lose transmission shaft is detectable, e.g. for activating wing tip brakes or for interrupting the operation of the PCU. Other unlikely events, such as a misalignment of a transmission shaft and a geared rotary actuator may be detected by dedicated sensors.

According to various embodiments, provided is an apparatus that increases the detectability of these events without necessarily requiring different dedicated sensors.

In one embodiment, a drive system for a high lift system of an aircraft comprising an opening and a transmission shaft is provided. The transmission shaft is rotatable about an axis and extends through said opening with a radial play. At least one first engaging element is located at the rotatable transmission shaft and protrudes radially outward into the opening. At least one second engaging element is located at the opening and protrudes radially inward into the opening. The first and second engaging elements engage each other in case a relative radial displacement between the transmission shaft and the opening exceeds the radial play, said engagement preventing further rotation of the transmission shaft.

The main components that may be used for reliably detecting a misalignment of the transmission shaft relative to an opening are therefore the first engaging elements and the second engaging elements. During a normal operation the transmission shaft extends through a first section of the opening such that it is freely rotatable. The transmission shaft may have a certain minor alignment tolerance. The transmission shaft may therefore conduct a rotational motion relative to the opening and may freely transfer mechanical power to high lift control surfaces. The transmission shaft may be realized as a transmission shaft extending through a root region of the respective wing into the direction of the wing tip. As an alternative or additionally, the transmission shaft may be a transmission shaft branch section extending from a main transmission shaft over a link or another component into the direction of a control surface to be moved.

In the normal operation the engaging elements attached to the transmission shaft and the opening are not hindering the intended function and maintain a sufficient distance to each other during their relative rotation. Hence, the transmission shaft must extend through a first section, which may for example be a centric section of the opening. In case a misalignment occurs, the transmission shaft has left a desired or intended position in a predetermined section of the opening such that the first and second engaging elements may engage.

In one example, the engaging elements are mechanical elements that are attached to the respective component in a rigid or flexible manner. The engaging elements may further be rigid or flexible elements made from any suitable material that is able to withstand the occurring arresting forces when the engaging elements engage. The engaging elements primarily provide a positive locking function.

Due to the relative rotation of the transmission shaft and the opening the at least one first engaging element moves in a circumferential direction in a revolving manner. The motion of the at least one first engaging element thereby spans up a circular shape that does not intersect with any second engaging element of the opening in the first mode of operation. Hence, a desired first section of the opening and predetermined tolerances for the alignment of the transmission shaft relative to the opening may simply be limited in one example, by the size, shape, position and number of the at least one first and at least one second engaging element. By defining a cross-sectional surface inside the opening it is adjustable, how far the first arresting means may move from a desired alignment position to a second mode of operation, in which the first and second engaging elements engage.

The drive system according to the various teachings of the present disclosure is particularly suitable for supplying, providing or transferring mechanical power to high lift surfaces under prevention of a misalignment of the transmission shaft, which misalignment may be described as a motion of the transmission shaft relative to an opening in a lateral/radial direction relative to a longitudinal or rotational axis of the transmission shaft or the opening. This is in particular useful in case the transmission shaft is connected to a rotational sensor, which detects the speed of rotation of the transmission shaft. Hence, in an event where a misalignment occurs, the relative rotation is arrested by engagement of the first and second engaging elements, which arresting is clearly detectable by the rotational sensor. A continued operation under the misalignment event can reliably be prevented through a mechanical setup that is simple and particularly maintenance free. Hence, the complexity of a drive system equipped with the first and second engaging elements hardly increases. At the same time, a precise detection of a mechanical issue is created.

It may be advantageous if the first and second engaging elements engage each other in such a way that the transmission shaft is jammed into a maximum radial displacement within the opening. The engaging elements thereby pull the transmission shaft to the opening in a radial direction. Hence, a reliable and strong engagement is achieved.

In one embodiment, the at least one first engaging element is a first tooth element, which points into a first direction of rotation of the transmission shaft and wherein the at least one second engaging element is a second tooth element directed against the first direction of rotation of the transmission shaft. Hence, if a first engaging element arranged on the transmission shaft comes into contact with a second engaging element, these two engaging elements engage each other strongly by sliding into or onto each other, when the transmission shaft rotates in the first direction of rotation. The achievable mechanical force between the two engaging elements is very high due to the occurring wedging effect and consequently allows an extremely reliable arresting. Also, a rotation into a second direction of rotation, which is the opposite to the first direction of rotation, may still be conducted, e.g. for returning the high lift system into a safer mode of operation such that the e.g. mechanical load onto the at least one transmission shaft will be decreased after a retraction.

In one exemplary embodiment, the opening is arranged in a support, which is attachable to or comprises a part of a structure of an aircraft. The support may provide for a radially flexible, i.e. easily adjustable setup of the second engaging elements arranged in the opening in order to tune the relationship between the first and second engaging elements by adjusting the spatial position of the at least one second engaging element. To ensure that the first and second engaging element may move in an unhindered manner during normal operation relative to each other, the margin or gap between the transmission shaft and the opening should equal a predetermined minimum measure.

In an embodiment, the at least one of the transmission shaft and the opening comprises an annular component equipped with the respective at least one first or second engaging element, which annular component is supported on the respective at least one of the transmission shaft and the opening in a radially flexible, i.e. elastic, manner. While such a setup also allows the adjustment between first and second engaging elements to each other they may be dimensioned smaller, as the radially flexible support contributes to the engagement between the engaging elements.

The radially flexible support of the annular component may be realized by means of at least one flexible element, e.g. a spring, extending between a support and the annular component. Hence, a mechanically simple construction is provided that is easily adjustable.

An embodiment further comprises a power control unit coupled with the transmission shaft, at least one sensor for measuring a rotational speed of at least one of the power control unit and the transmission shaft and a control unit coupled with the at least one sensor and adapted for comparing a detected speed with a commanded speed and for generating an output that corresponds to a misalignment in case a difference between the detected speed and the commanded speed exceeds a predetermined tolerance. Any clear misalignment of the transmission shaft automatically leads to arresting the transmission shaft relative to the opening and consequently to generating a signal that indicates the misalignment. The control unit may be a dedicated control unit or a control unit which is already present in the aircraft.

One embodiment comprises at least one geared actuator through which the transmission shaft extends, wherein the geared rotary actuator is mechanically coupled with the structure of the aircraft and comprises the opening. Hence, in case the coupling of the geared rotary actuator and the structure experiences an issue that leads to a lateral misalignment of the at least one transmission shaft and the geared rotary actuator relative to each other, the at least one transmission shaft will be arrested by the arresting apparatus on conducting a rotation.

Still further, the various teachings of the present disclosure relates to a method for detecting a misalignment between a transmission shaft and an opening in a drive system for a high lift system of an aircraft, comprising rotating a transmission shaft having a longitudinal axis and at least one first engaging element relative to an opening and at least one second engaging element that engages with the first engaging element in case of a misalignment, by means of a drive; measuring the speed of at least one of the drive and the transmission shaft; comparing a detected speed of the at least one of the drive and the transmission shaft with a commanded speed and generating an output that corresponds to a misalignment in case a difference between a detected speed and commanded speed exceeds a predetermined tolerance.

Hereby, the output may be a signal, a command, a set of data, etc. that is useful for a further processing, e.g. for arresting the drive, i.e. the PCU or any other drive. The predetermined tolerance may be in a range of about 1% to about 10% or more of the commanded speed. For example, the nominal speed of the transmission shaft may be about 800 rpm, the tolerance of the difference between the detected speed and the commanded speed may be in a range of about 8 rpm to about 80 rpm, exemplarily between about 25 rpm and about 35 rpm. Furthermore, as the PCU or any other suitable drive may not be able to provide a commanded speed all of a sudden, a predetermined time interval should be defined, in which time interval the detected tolerance between commanded speed and detected speed should be eliminated. For example, this time interval may be in a range of about 1 second to about 10 seconds and in one example, in a region of about 2 seconds to about 5 seconds, for example, as about 3 seconds.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
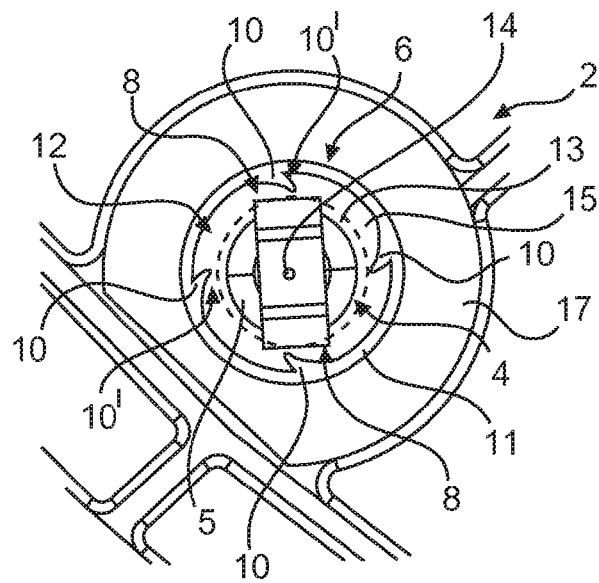
FIGS. 1A, 1B, 1C and 1D show a section of an exemplary embodiment of the drive system during normal operation (FIGS. 1A and 1B), a misalignment situation (FIG. 1C) and a schematic overview of different alignment states (FIG. 1D).

FIG. 1A shows a section of a drive system that is focused on the arresting function. This section is referred to as an "arresting apparatus" 2, from which a plurality may be integrated into the drive system, which is shown in an overview in FIG. 3. The arresting apparatus 2 is constituted by a first arresting means 4 as a part of a transmission shaft and a second arresting means 6 as a structural part or a part which is attachable to a structure, which second arresting means 6 surrounds the first arresting means 4. In this exemplary embodiment, the second arresting means 6 comprises an annular shape with four second engaging elements 10, while the first arresting component 4 exemplarily comprises two first engaging elements 8 extending outwardly from a first base member 5 towards the second arresting means 6 in a radial direction. The second engaging elements 10 extend from a second base member 11 inwardly towards the first arresting means 4 in a radial direction, and exemplarily comprise an unsymmetrical shape. The second engaging means 10 are realized as tooth-elements pointing into a clockwise direction, while the first engaging element 8 points into the other direction. This is more clearly visible in FIG. 1B.

By this design, the first engaging elements 8 and the second engaging elements 10 each comprise a flank 8' and 10' that enclose an acute angle to the circumference of the first arresting means 4 or the second arresting means 6, as well as one flank 8", 10" with an obtuse angle. Consequently, a very reliable, positive locking may be achieved with the first arresting means 4 rotating in a counter-clockwise direction and conducting a lateral motion relative to an opening 12 of the second arresting means 6.

Figure 1B:
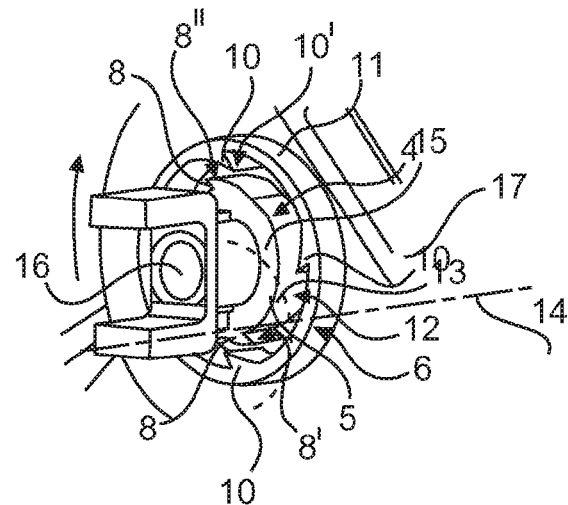

FIG. 1B demonstrates the lateral motion of the first arresting means 4, i.e. a part of a transmission shaft, by a longitudinal axis 14 moving upwards such that the first arresting means 4 moves from a first section 13 of the opening 12, as indicated by the arrow, to a second section 15 of the opening 12 at least partially. This means, that the first arresting means 4 intersects the second section 15. This is more clearly shown in FIG. 1D. Hence, the first arresting means 4 may be arrested in a first direction of rotation, which may equal the counter-clockwise direction relative to the second arresting means 6. In a second direction of rotation, which is opposite the first direction, the first arresting means 4 may still be rotated relative to the second arresting means 6, e.g. for reverting to a condition with a lower mechanical load. For example, such a saw-tooth-like arrangement may still allow to retract high lift surfaces into their retracted state, but may not permit to further extend the high lift surfaces.

Figure 1C:
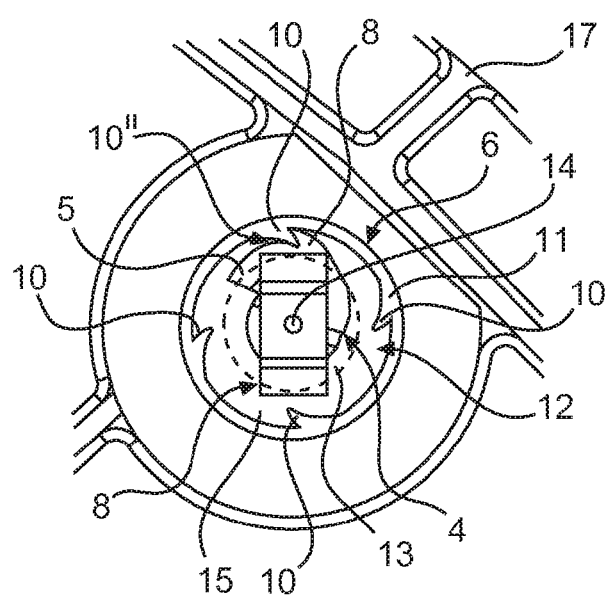

FIG. 1C shows an engagement of one first engaging element 8 and one second engaging element 10 with a laterally moved (misaligned) first arresting element 4. Here, a counter-clockwise rotation is not possible any more, as the first engaging element 8 and the second engaging element 10 block each other. Due to the tooth-shapes, the engaging elements 8 and 10 wedge or clamp into each other and provide a very reliable blocking action. Providing rotational power to the first arresting element 4 into this direction of rotation leads to an increase of a blocking or holding force. Still, a clockwise rotation may be possible to disengage the engaging elements 8 and 10.

The second arresting means 6 may be fixedly connected to an aircraft structure 17, while the first arresting means 4 may be connected to or be a part of a transmission shaft 16, which is used for providing mechanical power from a power control unit in a fuselage of an aircraft e.g. to geared rotary actuators on drive stations distributed along the wings of the aircraft. Hence, in case the rotary actuator experiences an issue that leads to a lateral motion, i.e. a local misalignment, between the transmission shaft 16 and the opening 12, a reliable and safe arresting of the transmission shaft 16 can be conducted. This may be sensed by rotary speed sensors, for example integrated into the PCU, in order to stop its operation.

Figure 1D:
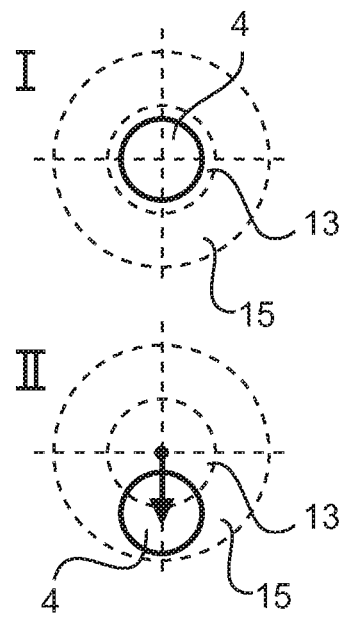

FIG. 1D shows a general overview of the first section 13 and a second section 15, in which the transmission shaft, shown by means of a first arresting means 4, may be located. The upper example, I, shows a location during normal operation. The first arresting means 4 is exclusively placed in the first section 13 and does not intersect the boundaries of the first section 13. II shows the location of the transmission shaft also in the second section 15, such that an engaging between the first and second engaging elements 8, 10 occurs.

Figure 2A:
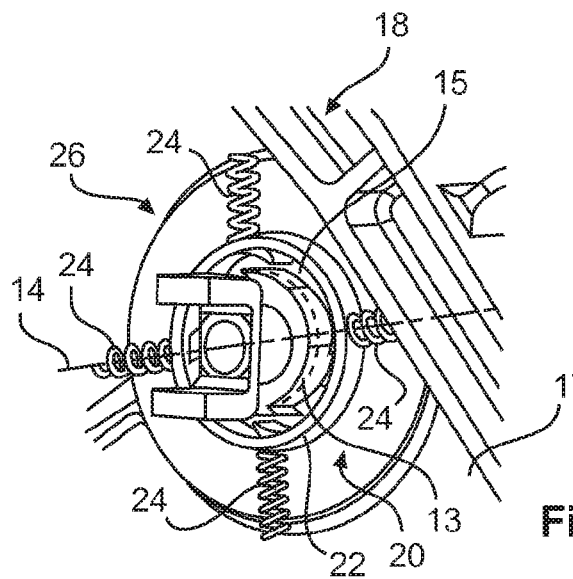
FIGS. 2A, 2B and 2C show a section of another exemplary embodiment of the drive system during normal operation (FIGS. 2A and 2B) and a misalignment situation (FIG. 2C).
Figure 2B:
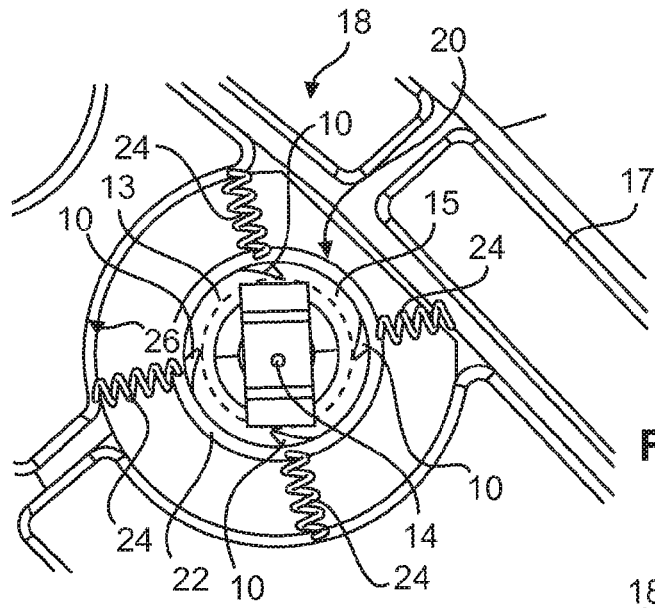
Figure 2C:
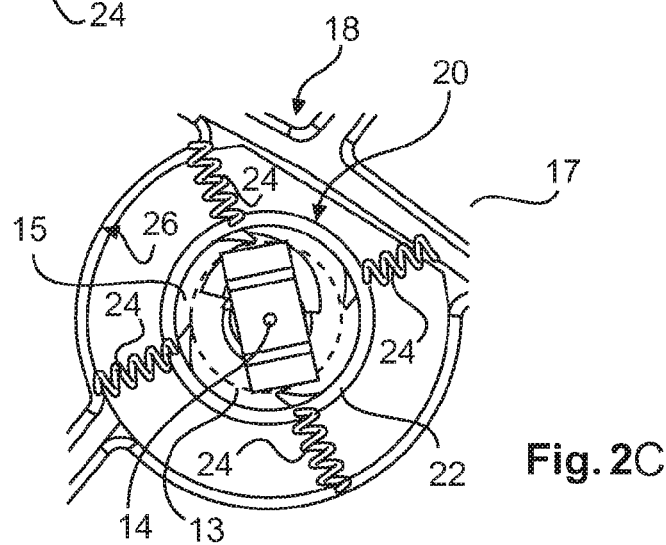

FIGS. 2A-2C show a modified arresting apparatus 18 which differs from arresting apparatus 2 of FIGS. 1A-1D in that a second arresting means 20 comprises a spring-loaded annular component 22 in form of an inner ring, the annular component 22 housing the second engaging elements 10. As an example, the annular component 22 is connected to four flexible elements 24 realized by means of springs that are distributed on an outer contour 26 in an equidistant manner, wherein the outer contour 26 is generally fixed to the structure 17.

By means of these flexible elements 24, a precise alignment as well as a radially flexible support to the second engaging elements 10 is provided, which increase the possible arresting force of the arresting apparatus 18 due to a supporting motion of the second engaging elements 10. Hence, by only slightly engaging two tips of engaging elements 8 and 10 due to the radial flexibility, a full engagement will consequently follow. As explained above, the first arresting means 4 may be connected to or be a part of a transmission shaft 16.

Figure 3:
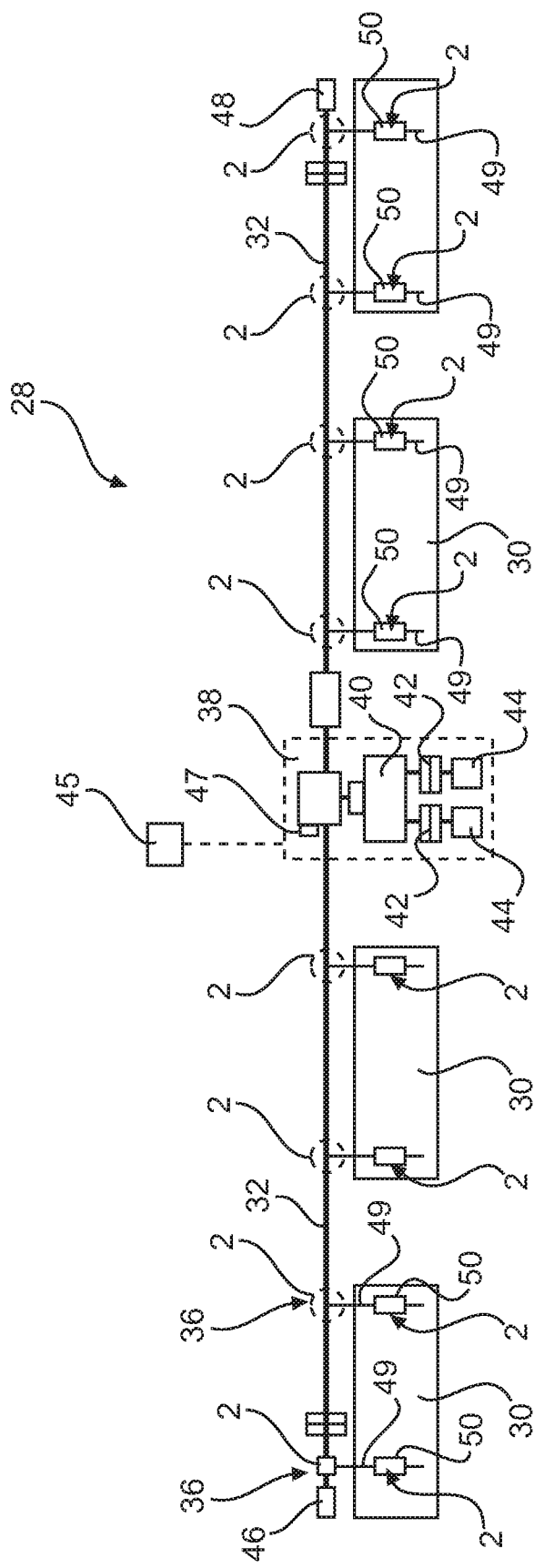
FIG. 3 shows a schematic overview of a drive system for a high lift system of an aircraft.

FIG. 3 shows a general overview of a drive system 28 of an aircraft for driving control surfaces 30, which may be trailing edge flaps or leading edge slats. The drive system 28 comprises a first transmission shaft 32 on a left side as well as a second transmission shaft 34 on a right side of the drive system 28, in order to provide rotational power to drive stations 36 coupled with the control surfaces 30. Several of these drive stations 36 are exemplarily distributed along a trailing and/or leading edge of each wing and are designed for converting rotary power into a translational movement of the control surfaces 30. The transmission shafts 32 and 34 are driven by a PCU 38, comprising a speed summing differential 40, two pressure or power off brakes 42 and two motor units 44. The PCU 38 is exemplarily located inside a fuselage of the aircraft.

The transmission shafts 32 and 34 each extend through the drive stations 36 to a wing tip brake 46 and 48, hence they may need to be aligned relative to particular openings in the drive stations 36, in the main extension direction of the transmission shafts 32 and 34 or along transmission shaft branch sections 49 branching off from the transmission shafts 32 and 34. In an unlikely event of a misalignment due to a mechanical issue inside a drive station 36 or at the transmission shaft 32, 34, or at the transmission shaft branch sections 49, the use of an arresting apparatus 2 or 18 according to the various teachings of the present disclosure is an advantageous approach to detect such a misalignment only by arresting the respective transmission shaft 32, 34 and/or transmission shaft branch section 49, respectively, and detecting the resulting loss of speed of the PCU 38 by means of at least one sensor 47 which may sense the rotational speed of the PCU 38 and/or the transmission shafts 32 and 34.

The drive system 38 may further comprise a control unit 45 coupled with the at least one sensor 47 and adapted for comparing a detected speed with a commanded speed. From this information, the control unit 45 may generate a signal/output that corresponds to a misalignment in case a difference between the detected speed and the commanded speed exceeds a predetermined tolerance. The control unit 45 may be integrated into an already existing control unit, e.g. through adding supplemental algorithms. The existing control unit may for example be one or more slat flap control computers (SFCC).

Figure 4:
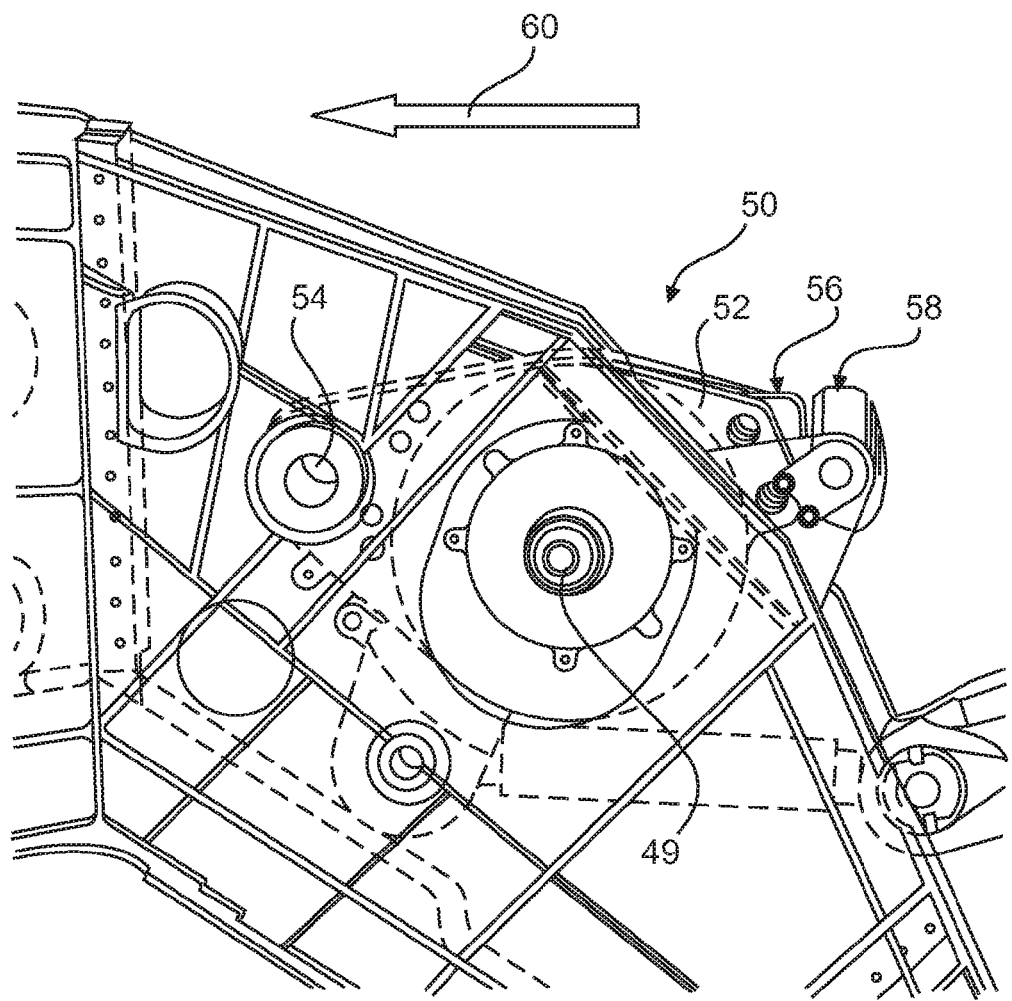
FIG. 4 shows a detail from the drive system of FIG. 3.

Furthermore, each drive station 36 may comprise a geared rotary actuator 50, coupled to the respective transmission shaft 32, 34 by means of a transmission branch section 49, which needs to extend through an opening in the respective geared rotary actuator 50. FIG. 4 shows a more detailed view onto a geared rotary actuator 50 having a support 52 attached to the aircraft structure 14 and being coupled with a transmission shaft branch section 49.

The support 52 may comprise a main lug 54, a pin 56 and a yoke 58 connected to the pin 56. In case of a failure of the pin 56, the yoke 58 or the main lug 54 the support 50 may conduct a lateral motion along a degree of freedom exemplarily indicated by an arrow 60. Consequently, the transmission shaft branch section 49 and the geared rotary actuator 50 will misalign. By integrating an arresting apparatus 2 into the geared rotary actuator 50 and the transmission shaft branch section 49, this misalignment leads to an arresting function. This will lead to a loss of speed of the PCU 38. Hence, by monitoring the PCU speed, a misalignment is detectable without requiring dedicated sensors.

The monitoring and comparison may be conducted by a dedicated calculation unit or, in one example, by an existing calculation unit, such as a slat/flap control computer (SFCC). On detecting a loss of speed of the PCU 38, the operation of the PCU 38 may be interrupted. Additionally, the wing tip brakes 46 and 48 may be activated in order to arrest the whole high lift system for increasing the safety.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A drive system for a high lift system of an aircraft, comprising:
    an opening,
    a transmission shaft being rotatable about an axis and extending through the opening with a radial play,
    at least one first engaging element being located at the transmission shaft and protruding radially outward into the opening,
    at least one second engaging element being located at the opening and protruding radially inward into the opening,
    wherein the at least one first engaging element and the at least one second engaging element engage each other and in case a relative radial displacement between the transmission shaft and the opening exceed the radial play, the engagement prevents further rotation of the transmission shaft.

2. The drive system of claim 1, wherein the at least one first engaging element and the at least one second engaging element engage each other in such a way that the transmission shaft is jammed into a maximum radial displacement within the opening.

3. The drive system of claim 1, wherein the at least one first engaging element and the at least one second engaging element are designed so as to wedge into each other in at least one direction of rotation when they engage.

4. The drive system claim 1,
    wherein the at least one first engaging element is a tooth-element pointed into a first direction of rotation of the transmission shaft and the at least one second engaging element is a tooth-element directed against the first direction of rotation of the transmission shaft.

5. The drive system of claim 1,
    wherein the opening is arranged in a support, which is attachable to a part of a structure of an aircraft.

6. The drive system of claim 1,
    wherein at least one of the transmission shaft and the opening comprises an annular component equipped with the respective one of the at least one first engaging element or the at least one second engaging element, which annular component is supported on the respective one of die transmission shaft and the opening in a radially flexible manner.

7. The drive system of claim 6,
    wherein the radially flexible support of the annular component is realized by means of at least one flexible element extending between a support and the annular component.

8. The drive system claim 1, further comprising:
    a power control unit coupled with the transmission shaft,
    at least one sensor for measuring a rotational speed of at least one of the power control unit and the transmission shaft, and
    a control unit coupled with the at least one sensor for comparing a detected speed with a commanded speed and for generating an output that corresponds to a misalignment in case a difference between the detected speed and the commanded speed exceeds a predetermined tolerance.

9. The drive system of claim 8, further comprising at least one geared rotary actuator through which the transmission shaft extends,
    wherein the geared rotary actuator is mechanically coupled with a structure of the aircraft and comprises the opening.

10. The drive system of claim 1, wherein the opening is arranged in a support, which is a part of a structure of an aircraft.

11. A method for detecting a misalignment between a transmission shaft and an opening in a drive system for a high lift system of an aircraft, the method comprising the steps of:
    rotating a transmission shaft having a longitudinal axis and at least one first engaging element relative to an opening and at least one second engaging element that engages with the first engaging element in case of a misalignment, by means of a drive;

measuring the speed of at least one of the transmission shaft and the drive;

comparing a detected speed of at least one of the transmission shaft and the drive with a commanded speed and generating an output that corresponds to a misalignment in case a difference between a detected speed and commanded speed exceeds a predetermined tolerance.

12. The method of claim 11, wherein the predetermined tolerance is in a range of 1% to 10% of the commanded speed.

13. A drive system for a high lift system of an aircraft, comprising:

an opening, a transmission shaft being rotatable about an axis and extending through the opening with a radial play, at least one first engaging element being located at the transmission shaft and protruding radially outward into the opening, at least one second engaging element being located at the opening and protruding radially inward into the opening, a power control unit coupled with the transmission shaft, at least one sensor for measuring a rotational speed of at least one of the power control unit and the transmission shaft, and a control unit coupled with the at least one sensor for comparing a detected speed with a commanded speed and for generating an output that corresponds to a misalignment in case a difference between the detected speed and the commanded speed exceeds a predetermined tolerance, wherein the at least one first engaging element and the at least one second engaging element engage each other and in case a relative radial displacement between the transmission shaft and the opening exceed the radial play, the engagement prevents further rotation of the transmission shaft.

14. The drive system of claim 13, further comprising at least one geared rotary actuator through which the transmission shaft extends, wherein the geared rotary actuator is mechanically coupled with a structure of the aircraft and comprises the opening.

15. The drive system of claim 13, wherein the at least one first engaging element and the at least one second engaging element engage each other in such a way that the transmission shaft is jammed into a maximum radial displacement within the opening.

16. The drive system of claim 13, wherein the at least one first engaging element and the at least one second engaging element are designed so as to wedge into each other in at least one direction of rotation when they engage.

17. The drive system claim 13, wherein the at least one first engaging element is a tooth-element pointed into a first direction of rotation of the transmission shaft and the at least one second engaging element is a tooth-element directed against the first direction of rotation of the transmission shaft.

18. The drive system of claim 13, wherein the opening is arranged in a support, which is attachable to a part of a structure of an aircraft.

19. The drive system of claim 13, wherein at least one of the transmission shaft and the opening comprises an annular component equipped with the respective one of the at least one first engaging element or the at least one second engaging element, which annular component is supported on the respective one of the transmission shaft and the opening in a radially flexible manner.

20. The drive system of claim 19, wherein the radially flexible support of the annular component is realized by means of at least one flexible element extending between a support and the annular component.

* * * * *